United States Patent [19]

Barnert et al.

[11] 4,340,019

[45] Jul. 20, 1982

[54] INTERNAL COMBUSTION DIESEL ENGINE

[75] Inventors: Konrad Barnert, Wolfsburg; Ingolf Löhner, Brunswick, both of Fed. Rep. of Germany

[73] Assignee: Volkswagenwerk Aktiengesellschaft, Wolfsburg, Fed. Rep. of Germany

[21] Appl. No.: 219,993

[22] Filed: Dec. 23, 1980

Related U.S. Application Data

[63] Continuation of Ser. No. 7,327, Jan. 29, 1979, abandoned.

[30] Foreign Application Priority Data

Feb. 7, 1978 [DE] Fed. Rep. of Germany ....... 2805133

[51] Int. Cl.[3] .......................... F02B 3/02; F02B 23/08

[52] U.S. Cl. .................................. 123/256; 123/253; 123/270; 123/308; 123/432; 123/433

[58] Field of Search ............... 123/256, 253, 261, 259, 123/270, 281, 191 SP, 191 A, 32 C, 432, 433, 308

[56] References Cited

U.S. PATENT DOCUMENTS 2,151,432 3/1939 Lyons et al. .................... 123/191 A
2,674,983 4/1954 Kraus ............................... 123/32 C
2,799,256 7/1957 Stump .............................. 123/32 C
3,058,452 10/1962 Espenschied ..................... 123/32 C
3,244,159 4/1966 Meurer .......................... 123/191 SP
3,776,212 12/1973 Karlowitz ..................... 123/191 SP
3,890,940 6/1975 List ...................................... 123/270
4,066,045 1/1978 Suzuki .............................. 123/32 C
4,124,000 11/1978 Genslak ............................... 123/256
4,175,531 11/1979 Tanahashi ........................ 123/191 S

*Primary Examiner*—Raymond A. Nelli
*Attorney, Agent, or Firm*—Brumbaugh, Graves, Donohue & Raymond

[57] ABSTRACT

An internal combustion diesel engine having a piston sliding in a cylinder and forming a main combustion chamber between the piston and the cylinder head. The cylinder head also has a pre-combustion chamber which communicates by a connecting passage with the main combustion chamber, with a fuel injection nozzle and glow plug arranged to project into the pre-combustion chamber. In addition, a smaller auxiliary chamber is provided which communicates with the pre-combustion chamber by a nozzle shaped aperture, and supplies additional combustion air to the pre-combustion chamber to help effectuate complete combustion, even at high engine loads, of the air-fuel mixture.

7 Claims, 3 Drawing Figures

INTERNAL COMBUSTION DIESEL ENGINE

This is a continuation, of application Ser. No. 007,327, now abandoned filed Jan. 29, 1979.

BACKGROUND OF THE INVENTION

The invention relates to an internal combustion diesel engine having a piston sliding in a cylinder and closed by a cylinder head forming the main combustion chamber. A pre-combustion chamber is arranged in the cylinder head and communicates by a connecting passage with the main combustion chamber, with a fuel injection nozzle and a glow plug arranged to project into the pre-combustion chamber.

In engines of this type, the injection and subsequent self-ignition of the injected fuel takes place in the pre-combustion chamber, which is designed in general as a turbulence chamber. The volume of the pre-combustion chamber is usually about 30–60% of the total compression volume of the main combustion chamber of the corresponding cylinder. Following the ignition of the fuel-air mixture in the pre-combustion chamber, the gas flame ignites through the connecting passage into the main chamber.

With the piston near top dead center, there is a very close spacing between the piston and the cylinder head, and the main combustion chamber is formed essentially by a trough-shaped recess incorporated into the face of the piston. The trough-shaped recess in the piston distributes the flame gases as uniformly as possible through the entire remaining portion of the main combustion chamber between the face of the piston and the cylinder head. This helps to assure extensive combustion of the entire mixture and a resulting high degree of efficiency of the diesel engine.

It has been found, however, that in turbulence-chamber diesel engines of this type, especially under full load conditions, a so-called black smoke developes as a result of incomplete combustion of the fuel, which it has hitherto been possible to reduce only by cutting down the quantity of fuel injected into the engine, which in turn dictates limiting the performance of the engine.

SUMMARY OF THE INVENTION

In accordance with the present invention, combustion in an internal combustion diesel engine of the abovementioned type is improved to reduce substantially the formation of the black smoke, with no need for reduction in engine performance.

More particularly, in accordance with the present invention a smaller auxiliary chamber is provided which communicates with the pre-combustion chamber by a nozzle-shaped aperture. The additional auxiliary chamber has a volume preferably of about 5–20% of the volume of the pre-combustion chamber, and serves to store oxygen until after ignition of the fuel-air mixture in the pre-combustion chamber is initiated. As combustion is taking place in the pre-combustion and then main combustion chamber, the stored air in the auxiliary chamber is pulled out through the nozzle-shaped connecting aperture between the auxiliary and pre-combustion chambers and introduced into the pre-combustion turbulence chamber. This causes a prolonging of the combustion time and results in a more complete combustion and scavenging of the air-fuel mixture in the pre-combustion chamber.

In one form of the invention, the auxiliary chamber is designed as a recess encircling the glow plug, and communicates with the pre-combustion chamber by a ring slot gap remaining between the glow plug and the glow plug mounting bore. Alternatively, the auxiliary chamber may be arranged on the periphery of the pre-combustion chamber so that its nozzle shaped apertures lies within the injection path of the injection jet of the fuel injection nozzle. In this form of the invention, some of the injected fuel also reaches the auxiliary chamber, so that combustion takes place there as well. During idling and at low load conditions and engine speeds in particular, in which only weak turbulence of the combustion air takes place, with the consequent occurrence of engine lags, better ignition and combustion may be obtained with the air of the smaller auxiliary chamber.

In accordance with a further refinement of the invention, the combustion process may be further improved by coating the walls of the auxiliary chamber with a catalytically active material. Such coatings may consist, for example, of platinum, rhodium, palladium, or other noble metals. Alternatively, other non-noble metal catalysts, for example, copper-chromium-nickel alloys may be used. The catalytic coating of the auxiliary chamber surface will then cause accelerated oxidation at lower temperatures, so that the idling properties of the diesel engine may be improved.

In a modified form, the auxiliary chamber may be filled with a porous material having a high oxygen-storage capacity, for example, a ceramic material containing zirconium or a zirconium compound. In this arrangement, the advantages of providing an auxiliary chamber as set forth above are realized, while at the same time the volume of the pre-combustion chamber (which now includes the auxiliary chamber) will not be greatly increased, as would reduce the overall engine compression ratio.

BRIEF DESCRIPTION OF THE DRAWINGS

For a better understanding of the invention, reference may be made to the following detailed description and the accompanying drawings, in which.

DETAILED DESCRIPTION OF THE INVENTION

Figure 1:
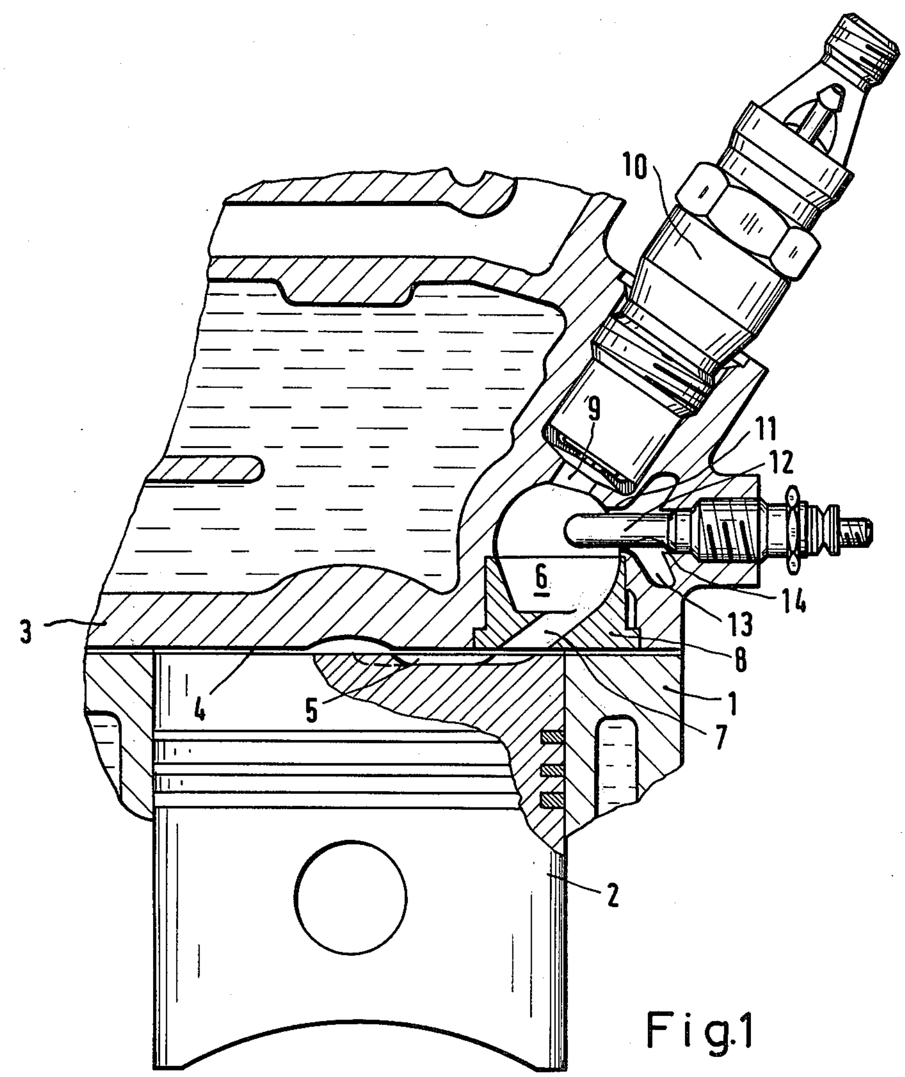
FIG. 1 is a longitudinal sectional view through a portion of an internal combustion diesel engine having a turbulence pre-combustion chamber and auxiliary chamber according to the invention.
Figure 2:
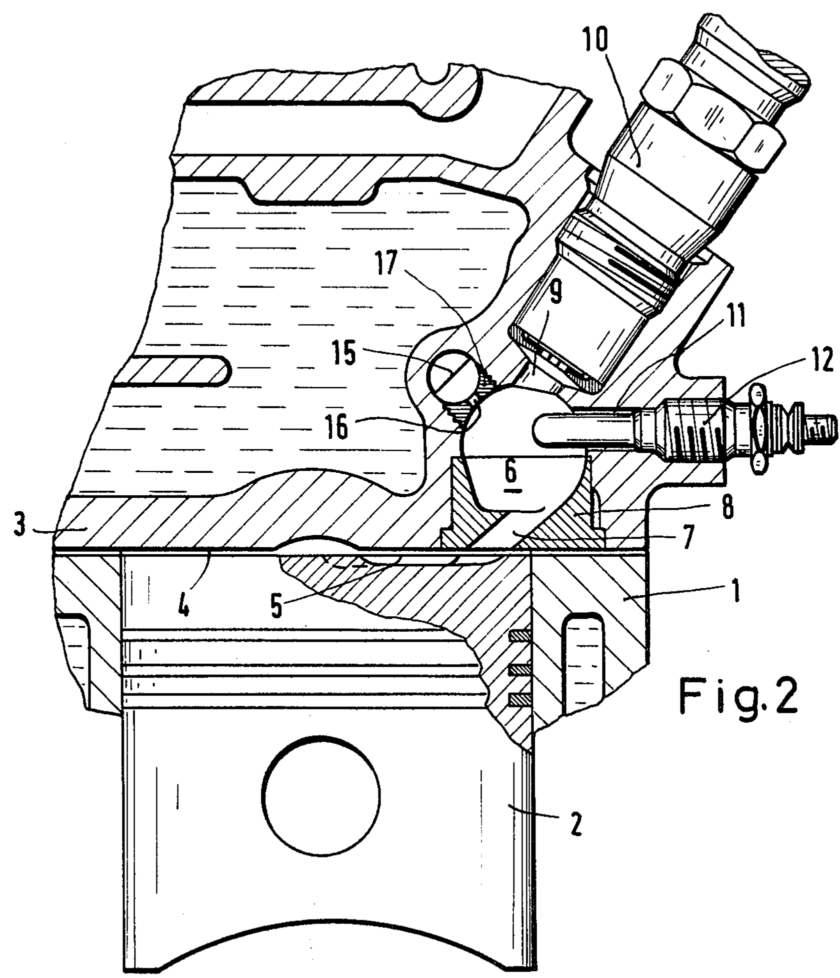
FIG. 2 is a longitudinal sectional view of an alternative arrangement according to the invention.
Figure 3:
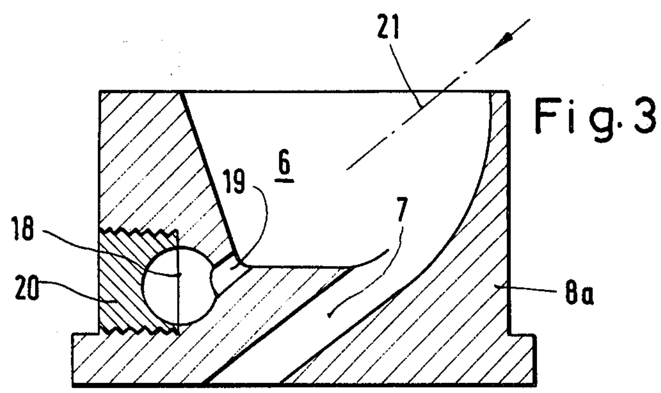
FIG. 3 is a longitudinal sectional view through a portion of a pre-combustion chamber for a turbulence-chamber diesel engine, embodying a third form of the invention.

In the three forms of the invention illustrated in FIGS. 1–3, like reference numerals refer to like components. Referring then to the drawings, an internal combustion diesel engine includes a cylinder block 1, a sliding piston 2 which is contained in the bore of a cylinder 1, to form a main combustion chamber 4 between the piston 2 and a cylinder head 3. In the cylinder head 3, a pre-combustion chamber 6 is arranged which communicates by a connecting passage 7 with the main combustion chamber 4. At top dead center of the compression stroke, shown in FIGS. 1 and 2, the main combustion chamber 4 is formed essentially by a trough-shaped recess 5 incorporated in the face of the piston. An insert 8 is interposed between the pre-combustion chamber 6 and the main chamber 4 and contains the connecting passage 7. An injection nozzle 10 is arranged in the cylinder head 3 and projects into the pre-combustion chamber 6; also a glow plug 12, mounted in a mounting bore 11, projects directly into the pre-combustion chamber 6.

Referring to the embodiment shown in FIG. 1, the auxiliary chamber 13 is in the form of a recess encircling the glow plug. The recess 13 communicates with the precombustion chamber by a ring slot 14 which is formed between the glow plug 12 and the glow plug mounting bore 11.

During the intake and compression strokes of the engine, fresh air is drawn into not only the main chamber 4 and the pre-combustion chamber 6, but also, by the ring slot 14, the auxiliary chamber 13. As is usual in this type of internal combustion engine, during the compression stroke strong turbulence exists in the pre-combustion chamber as a result of the somewhat tangential entry of the air through the connecting passage 7. With the air drawn in, which is in a highly turbulent state and under high pressure, fuel is injected by the injection nozzle 10 and is rapidly vaporized and ignited. After ignition, the fuel-air mixture present in the pre-combustion chamber is the first to burn. As a result, however, of its proximity to the fuel injection nozzle 10, the mixture is relatively rich and thus will not have sufficient oxygen for complete combustion, especially at high loads. With the presence of the auxiliary chamber 13, additional stored air is available which may be supplied to the pre-combustion chamber to continue the combustion process. The flame burning in the pre-combustion chamber and passing into the main combustion chamber 4 by the connecting passage 7 draws air stored in the auxiliary chamber 13 through the nozzle-shaped ring slot 14 into the pre-combustion chamber 6, thus prolonging combustion in the pre-combustion chamber 6. Thereby, the combustion process is markedly improved. In particular, the formation of the troublesome and harmful black smoke which would otherwise occur at full engine load is substantially reduced.

An alternative form of the invention is shown in FIG. 2. In this embodiment, the auxiliary chamber 15 is formed as a recess in the cylinder head 3 on the periphery of the pre-combustion chamber 6. A ring 17 with a nozzle-shaped connecting aperture 16 is screwed into the chamber-shaped recess, and connects the auxiliary chamber 15 with the pre-combustion chamber 6.

A third form of the invention is shown in FIG. 3. The auxiliary chamber 18 is formed in the insert **8*a* separating the pre-combustion chamber from the main chamber 4. The outside portion of the auxiliary chamber 18 is formed by a screw-in insert 20, and communication with the pre-combustion chamber is provided by a nozzle-shaped bore 19. In general, fuel exiting from the fuel injection device 10, directed through the connecting passage 9, is injected into the pre-combustion chamber 6 in more or less an injection path, designated as 21. In this form of the invention, the auxiliary chamber 18 and nozzle-shaped bore 19 are arranged to lie in the path 21 of the injection jet of the fuel injection nozzle, so that a portion of the fuel injected into the pre-combustion chamber 6 from the fuel injection nozzle 10 likewise reaches the smaller auxiliary chamber 18, which preferably has a volume of about 5–20% of the volume of the pre-combustion chamber 6. As a result, particularly in idling and at lower partial loads of the engine, when insufficient turbulent motion of the air in the pre-combustion chamber 6 may be present due to the low engine speed, improved ignition and combustion are obtained with the use of this arrangement of the auxiliary chamber 18**.

Further improvement of engine performance is possible by coating the walls of the auxiliary chamber with a catalytically active material, for example a noble metal such as platinum or the like, or with a non-noble metal catalyst.

Additionally, the auxiliary chamber, according to the invention, may be filled fully or partially with a porous material having a high capacity for the storage of oxygen, for example a ceramic metal containing zirconium or a zirconium compound. In this way, enlargement of the volume of the pre-combustion chamber (including the auxiliary chamber), with a resultant reduction in the compression ratio of the diesel engine, is avoided. At the same time, however, a significant amount of oxygen would be made available.

While the invention has been shown and described with reference to preferred embodiments thereof, it will be understood that certain variations and modifications will be apparent to persons skilled in the art, while utilizing the inventive concepts disclosed herein. All such variations and modifications are intended to be within the scope of the present invention, as defined in the following claims.

We claim:

1. In an internal combustion diesel engine having a piston sliding in a cylinder, said cylinder closed by a cylinder head forming a main combustion chamber, and having a pre-combustion chamber arranged in the cylinder head and communicating by a connecting passage with the main combustion chamber, a fuel injection nozzle projecting into said pre-combustion chamber, and a glow plug projecting into said pre-combustion chamber, the improvement wherein said engine includes auxiliary chamber means for storing oxygen during the initial period of combustion comprising an auxiliary chamber which is smaller than said pre-combustion chamber and communication means between said auxiliary chamber and said pre-combustion chamber including a nozzle-shaped aperature for introducing air contained in said auxiliary chamber into said pre-combustion chamber through said aperture, wherein the stored oxygen is drawn out of said auxiliary chamber, after ignition of the fuel-air mixture in the pre-combustion chamber is initiated, for combustion with remaining unburned fuel in said pre-combustion chamber.

2. An internal combustion engine according to claim 1, wherein said auxiliary chamber is designed to have a volume of 5–20% of the volume of the pre-compression chamber.

3. An internal combustion engine according to claim 1 or 2, wherein said glow plug is mounted in said cylinder head in a glow-plug mounting bore, said auxiliary chamber is designed as a recess encircling said glow plug, and said glow plug and said mounting bore are designed to form a ring slot communicating between said auxiliary chamber and said pre-combustion chamber.

4. An internal combustion engine according to claim 1 or 2, wherein said fuel injection nozzle means is adapted to spray fuel into said pre-combustion chamber along an injection path, and said auxiliary chamber is arranged on the periphery of said pre-combustion chamber and so that its nozzle-shaped communicating aperture lies within the region of the injection path of said injection nozzle means.

5. An internal combustion engine according to claim 1, wherein the walls of the auxiliary chamber are provided with a catalytically active coating.

6. An internal combustion engine according to claim 1, further comprising a porous material having a high capacity for the storage of oxygen disposed in said auxiliary chamber.

7. An internal combustion engine according to claim 6, wherein said material comprises a ceramic material containing zirconium or a zirconium compound.

* * * * *